United States Patent
Usami (10) Patent No.: US 6,961,144 B2
(45) Date of Patent: Nov. 1, 2005

(54) IMAGE DATA TRANSMISSION DEVICE AND METHOD, COMPUTER-READABLE STORAGE MEDIUM STORING PROGRAM FOR TRANSMITTING IMAGE DATA, AND IMAGE DATA TRANSMISSION AND RECEPTION SYSTEM AND METHOD

(75) Inventor: Yasushi Usami, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 852 days.

(21) Appl. No.: 09/874,123

(22) Filed: Jun. 6, 2001

(65) Prior Publication Data

US 2002/0051190 A1    May 2, 2002

(30) Foreign Application Priority Data

Jun. 6, 2000  (JP)  ............................. 2000-168577

(51) Int. Cl.[7] .......................... G06K 15/00; H04N 1/00
(52) U.S. Cl. ................. 358/1.15; 358/400; 379/100.01
(58) Field of Search ..................... 358/1.15, 3.29, 358/400, 401, 404, 444, 468, 434, 405, 406, 358/407, 426.08, 438, 439, 440, 443; 379/100.01

(56) References Cited

U.S. PATENT DOCUMENTS

| 5,084,770 | A |   | 1/1992  | Nakayama |             |
|-----------|---|---|---------|----------------|--------|
| 5,200,830 | A |   | 4/1993  | Imaizumi et al. |        |
| 5,608,540 | A | * | 3/1997  | Ogawa          | 358/434 |
| 5,668,855 | A | * | 9/1997  | Misholi et al. | 379/88.22 |
| 6,137,599 | A |   | 10/2000 | Mullin         |        |
| 6,298,239 | B1 | * | 10/2001 | Yonemoto et al. | 455/466 |
| 6,411,393 | B1 | * | 6/2002  | Wakasugi       | 358/1.15 |
| 6,775,023 | B1 | * | 8/2004  | Fukunaga et al. | 358/1.15 |

FOREIGN PATENT DOCUMENTS

| JP | 64-74862 A | 3/1989 |
|----|------------|--------|
| JP | 09-55825 A | 2/1997 |
| JP | 10-145379 A | 5/1998 |
| WO | WO 97/46002 A | 12/1997 |

* cited by examiner

Primary Examiner—Jerome Grant
(74) Attorney, Agent, or Firm—Smith Patent Office

(57) ABSTRACT

To enable image data to be transmitted and received in an efficient manner by making effective use of relatively narrow band communications circuits in image data reception devices, an image data management device transmits image data stored in the auxiliary storage section to a plurality of printing control devices connected thereto via the Internet. In this image management device, when transmitting image data, a transmission instruction registering section registers a transmission instruction including a transmission destination, transmission instruction timing, transmission priority, etc., is registered in the transmission instruction table, and a transmission image data setting section sets a transmission order for the image data for each transmission destination, on the basis of the timing at which transmission was instructed, and the transmission priority, and a plurality of image data corresponding to a plurality of transmission destinations are transmitted in parallel according to the set transmission order for each transmission destination.

14 Claims, 11 Drawing Sheets

TRANSMISSION INSTRUCTION TABLE

| REGISTRATION NUMBER | TRANSMISSION DESTINATION | FILE NAME | PRIORITY | REGISTRATION TIMING | STATUS | TRANSMISSION ORDER |
|---|---|---|---|---|---|---|
| 0001 | shop1 | ID1_0001.JPG | NORMAL | 00.5.25.11:25 | PROCESSED |   |
| 0002 | | ID1_0002.JPG | NORMAL | 00.5.25.11:25 | PROCESSED |   |
| 0003 | | ID1_0003.JPG | NORMAL | 00.5.25.11:25 | PROCESSED |   |
| 0004 | | ID1_0004.JPG | NORMAL | 00.5.25.11:25 | PROCESSING |   |
| 0005 | | ID1_0005.JPG | NORMAL | 00.5.25.11:25 | PENDING | 1 |
| 0006 | | ID2_0001.JPG | NORMAL | 00.5.25.11:28 | PENDING | 2 |
| 0007 | | ID2_0002.JPG | NORMAL | 00.5.25.11:28 | PENDING | 3 |
| 0008 | shop2 | ID3_0001.JPG | NORMAL | 00.5.25.11:32 | PENDING |   |
| 0009 | | ID3_0002.JPG | NORMAL | 00.5.25.11:32 | PENDING | 1 |
| 0010 | | ID3_0003.JPG | NORMAL | 00.5.25.11:32 | PENDING | 2 |
| 0011 | | ID3_0004.JPG | NORMAL | 00.5.25.11:32 | PENDING | 3 |

TRANSMISSION INSTRUCTION TABLE

| REGISTRATION NUMBER | TRANSMISSION DESTINATION | FILE NAME | PRIORITY | REGISTRATION TIMING | STATUS | TRANSMISSION ORDER |
|---|---|---|---|---|---|---|
| 0001 | shop1 | ID1_0001.JPG | NORMAL | 00.5.25.11:25 | PROCESSED | |
| 0002 | | ID1_0002.JPG | NORMAL | 00.5.25.11:25 | PROCESSED | |
| 0003 | | ID1_0003.JPG | NORMAL | 00.5.25.11:25 | PROCESSED | |
| 0004 | | ID1_0004.JPG | NORMAL | 00.5.25.11:25 | PROCESSING | |
| 0005 | | ID1_0005.JPG | NORMAL | 00.5.25.11:25 | PENDING | 1 |
| 0006 | shop2 | ID2_0001.JPG | NORMAL | 00.5.25.11:28 | PENDING | 2 |
| 0007 | | ID2_0002.JPG | NORMAL | 00.5.25.11:28 | PENDING | 3 |
| 0008 | | ID3_0001.JPG | NORMAL | 00.5.25.11:32 | PENDING | 1 |
| 0009 | | ID3_0002.JPG | NORMAL | 00.5.25.11:32 | PENDING | 2 |
| 0010 | | ID3_0003.JPG | NORMAL | 00.5.25.11:32 | PENDING | 3 |
| 0011 | | ID3_0004.JPG | NORMAL | 00.5.25.11:32 | PENDING | |

FIG. 7

TRANSMISSION INSTRUCTION TABLE

| REGISTRATION NUMBER | TRANSMISSION DESTINATION | FILE NAME | PRIORITY | REGISTRATION TIMING | STATUS | TRANSMISSION ORDER |
|---|---|---|---|---|---|---|
| 0001 | shop1 | ID1_0001.JPG | NORMAL | 00.5.25.11:25 | PROCESSED | |
| 0002 | | ID1_0002.JPG | NORMAL | 00.5.25.11:25 | PROCESSED | |
| 0003 | | ID1_0003.JPG | NORMAL | 00.5.25.11:25 | PROCESSED | |
| 0004 | | ID1_0004.JPG | NORMAL | 00.5.25.11:25 | PROCESSED | |
| 0005 | | ID1_0005.JPG | NORMAL | 00.5.25.11:25 | PROCESSING | |
| 0006 | | ID2_0001.JPG | NORMAL | 00.5.25.11:28 | PENDING | 1 |
| 0007 | | ID2_0002.JPG | NORMAL | 00.5.25.11:28 | PENDING | 2 |
| 0008 | shop2 | ID3_0001.JPG | NORMAL | 00.5.25.11:32 | PROCESSED | |
| 0009 | | ID3_0002.JPG | NORMAL | 00.5.25.11:32 | PROCESSING | |
| 0010 | | ID3_0003.JPG | NORMAL | 00.5.25.11:32 | PENDING | 6 |
| 0011 | | ID3_0004.JPG | NORMAL | 00.5.25.11:32 | PENDING | 7 |
| 0012 | | ID4_0001.JPG | HIGH | 00.5.25.11:40 | PENDING | 1 |
| 0013 | | ID4_0002.JPG | HIGH | 00.5.25.11:40 | PENDING | 2 |
| 0014 | | ID4_0003.JPG | HIGH | 00.5.25.11:40 | PENDING | 3 |
| 0015 | | ID4_0004.JPG | HIGH | 00.5.25.11:40 | PENDING | 4 |
| 0016 | | ID4_0005.JPG | HIGH | 00.5.25.11:40 | PENDING | 5 |

FIG. 8

TRANSMISSION INSTRUCTION TABLE

| REGISTRATION NUMBER | TRANSMISSION DESTINATION | FILE NAME | PRIORITY | REGISTRATION TIMING | STATUS | TRANSMISSION ORDER |
|---|---|---|---|---|---|---|
| 0001 | shop1 | ID1_0001.JPG | NORMAL | 00.5.25.11:25 | PROCESSED | |
| 0002 | | ID1_0002.JPG | NORMAL | 00.5.25.11:25 | PROCESSED | |
| 0003 | | ID1_0003.JPG | NORMAL | 00.5.25.11:25 | PROCESSED | |
| 0004 | | ID1_0004.JPG | NORMAL | 00.5.25.11:25 | PROCESSED | |
| 0005 | | ID1_0005.JPG | NORMAL | 00.5.25.11:25 | PROCESSING | |
| 0006 | | ID2_0001.JPG | NORMAL | 00.5.25.11:28 | PENDING | 1 |
| 0007 | | ID2_0002.JPG | NORMAL | 00.5.25.11:28 | PENDING | 2 |
| 0008 | shop2 | ID3_0001.JPG | NORMAL | 00.5.25.11:32 | PROCESSED | |
| 0009 | | ID3_0002.JPG | NORMAL | 00.5.25.11:32 | PROCESSED | |
| 0010 | | ID3_0003.JPG | NORMAL | 00.5.25.11:32 | PROCESSING | |
| 0011 | | ID3_0004.JPG | NORMAL | 00.5.25.11:32 | PENDING | 9 |
| 0012 | | ID4_0001.JPG | HIGH | 00.5.25.11:40 | PENDING | 4 |
| 0013 | | ID4_0002.JPG | HIGH | 00.5.25.11:40 | PENDING | 5 |
| 0014 | | ID4_0003.JPG | HIGH | 00.5.25.11:40 | PENDING | 6 |
| 0015 | | ID4_0004.JPG | HIGH | 00.5.25.11:40 | PENDING | 7 |
| 0016 | | ID4_0005.JPG | HIGH | 00.5.25.11:40 | PENDING | 8 |
| 0017 | | ID5_0001.JPG | HIGHEST | 00.5.25.11:45 | PENDING | 1 |
| 0018 | | ID5_0002.JPG | HIGHEST | 00.5.25.11:45 | PENDING | 2 |
| 0019 | | ID5_0003.JPG | HIGHEST | 00.5.25.11:45 | PENDING | 3 |

TRANSMISSION INSTRUCTION TABLE

| REGISTRATION NUMBER | FILE NAME | PRIORITY | REGISTRATION TIMING | STATUS | TRANSMISSION ORDER |
|---|---|---|---|---|---|
| 0001 | ID3_0001.JPG | NORMAL | 00.5.25.11:35 | PROCESSED | |
| 0002 | ID3_0002.JPG | NORMAL | 00.5.25.11:35 | PROCESSED | |
| 0003 | ID3_0003.JPG | NORMAL | 00.5.25.11:35 | PROCESSED | |
| 0004 | ID5_0001.JPG | HIGHEST | 00.5.25.11:48 | PROCESSING | |
| 0005 | ID5_0002.JPG | HIGHEST | 00.5.25.11:48 | PENDING | 1 |
| 0006 | ID5_0003.JPG | HIGHEST | 00.5.25.11:48 | PENDING | 2 |
| 0007 | ID4_0001.JPG | HIGH | 00.5.25.11:55 | PENDING | 3 |
| 0008 | ID4_0002.JPG | HIGH | 00.5.25.11:55 | PENDING | 4 |
| 0009 | ID4_0003.JPG | HIGH | 00.5.25.11:55 | PENDING | 5 |
| 0010 | ID4_0004.JPG | HIGH | 00.5.25.11:55 | PENDING | 6 |
| 0011 | ID4_0005.JPG | HIGH | 00.5.25.11:55 | PENDING | 7 |
| 0012 | ID3_0004.JPG | NORMAL | 00.5.25.12:10 | PENDING | 8 |

IMAGE DATA TRANSMISSION DEVICE AND METHOD, COMPUTER-READABLE STORAGE MEDIUM STORING PROGRAM FOR TRANSMITTING IMAGE DATA, AND IMAGE DATA TRANSMISSION AND RECEPTION SYSTEM AND METHOD

BACKGROUND OF THE INVENTION

1. Field of the Invention

This invention relates to technology for image data transmission and reception technology, for transmitting and receiving image data between an image data transmission device and an image data reception device, which are connected via a network such as the Internet.

2. Discussion of the Related Art

In the field of providing photography-related services, a photographer takes a film from a camera, or a memory card from a digital camera, to a mini-lab store, and photographs are developed and printed, or the like, on the basis of the image data (image files) contained on the film or memory card, by means of a prescribed printing control device situated in the mini-lab store.

Conventionally, a printing control device of this kind, a personal computer (hereinafter, called a "PC") located in a home, and a prescribed image management device which centrally manages image files uploaded from the printing control device or a PC, are mutually connected by means of the Internet, and an image management system is formed by connection of these devices. More particularly, in an image management system of this kind, image data for a plurality of photographers (users operating PC), which has been uploaded to the image management device for centralized management, is downloaded from the image management device to the printing control device on the basis of commands from a PC, and the PC user is hence able readily to order (re)prints of desired photographs.

However, in an image management system of this kind, a large volume of image data for a large number of users is transmitted from the image management device to the printing control device (situated in a mini-lab store), and hence the time required to transmit this image data is long, when a narrow band communications circuit (approximately several 10–100 Kbps) is being used.

By introducing a broad band communications circuit (of the order of several Mbps) between the image management device and the printing control device, it is possible to shorten the communications time, but this circuit is not used efficiently at night, for example, when there are no operators, or at times where there are no print orders, and therefore, it is difficult to use a broadband communications network of this kind with sufficient efficiency for it to prove beneficial with respect to the communications cost.

SUMMARY OF THE INVENTION

It is an object of the present invention to provide an image data transmission device and method, and image transmission and reception system and method, and program for transmitting image data which are free from the problems residing in the prior art.

It is another object of the present invention to provide an image data transmission and reception system and method which can achieve efficient transmission and reception of image data by efficient use of a communications circuit having a relating narrow bandwidth at the image data reception device.

According to an aspect of the invention, an image data transmission device transmits a plurality of groups of image data stored in a storage section to a prescribed plurality of image data reception devices connected thereto via a network, on the basis of transmission instructions. Transmission destination data identifying an image data reception device forming a transmission destination, and timing data indicating the timing at which transmission was instructed are stored in a corresponding fashion with each group of image data to be transmitted inside the storage section. A transmission order for image data is set for each transmission destination, on the basis of the timing data. A plurality of image data corresponding to a plurality of transmission destinations are controlled in such a manner that the image data is transmitted in parallel according to the set transmission order for each transmission destination.

Furthermore, an image data transmission and reception system is provided with the image data transmission device for transmitting a plurality of groups of image data stored in a storage section, on the basis of transmission instructions, and a plurality of image data reception devices connected to the image data transmission device via a network. In the image data reception devices, the transmitted image data is stored; and printing is performed on the basis of the stored image data, if it is judged that printing has been instructed.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS

Figure 1:
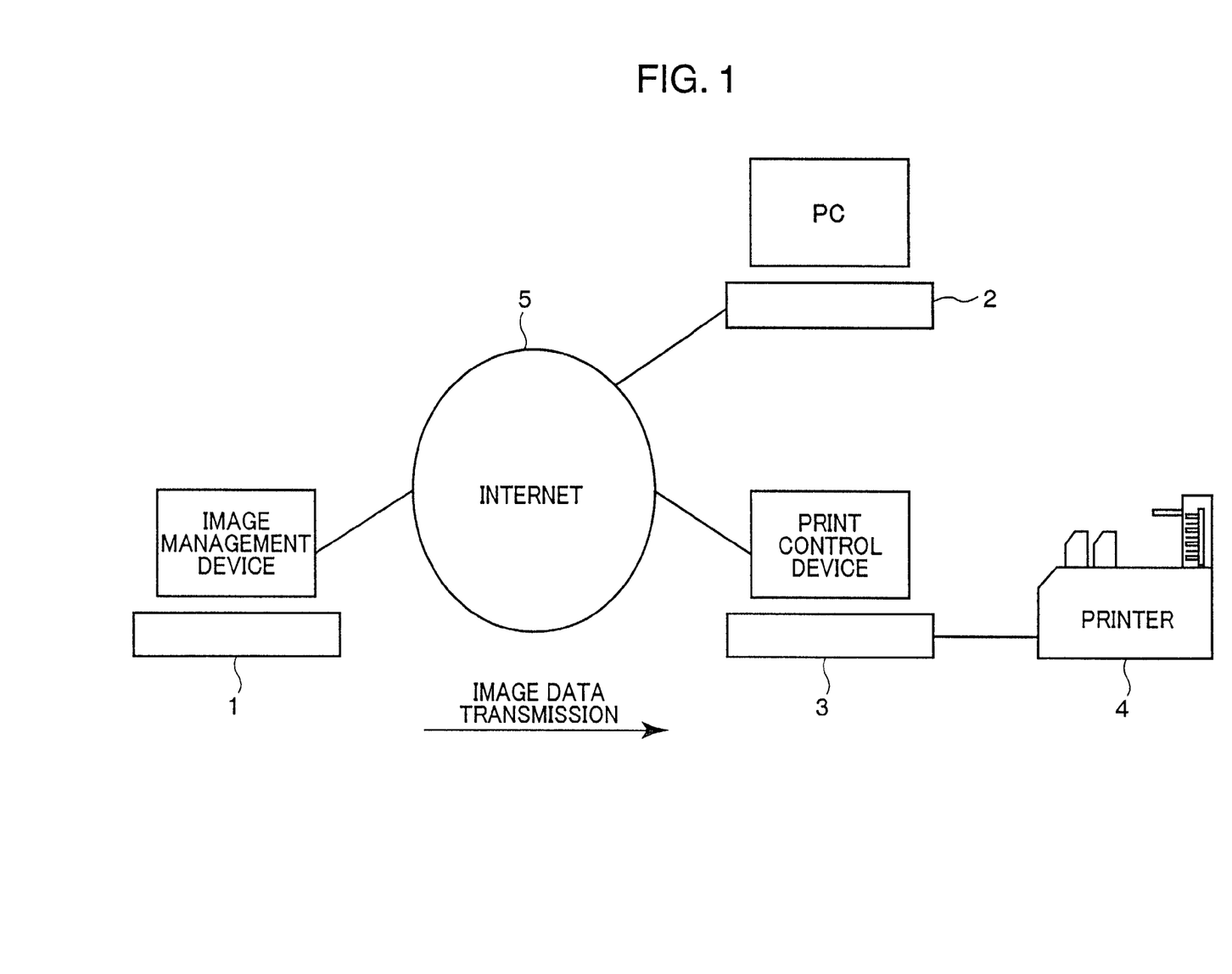
FIG. 1 is a diagram illustrating a general construction of an image processing system according to an embodiment of the present invention.

An image processing system according to an embodiment of the present invention is described below with reference to the drawings. Referring to FIG. 1 showing an image processing system according to an embodiment of the present invention, the image processing system comprises a PC 2 located in a normal home, for receiving image print instructions, and the like, from a user; a print control device 3, located in a mini-lab store, for controlling a printer 4 for developing and printing photographs, and the like; and an image management device 1 for centrally managing image data transmitted by the PC 2 or the print control device 3; the image management device 1, PC 2 and print control device 3 being mutually connected by means of the Internet 5.

Here, in particular, it is assumed that the printing control device 3 is located respectively in a plurality of mini-lab stores, and the following description relates to an image data transmission and reception method in a case where image data is transmitted from the image management device 1 to a plurality of printing control devices 3.

Figure 2:
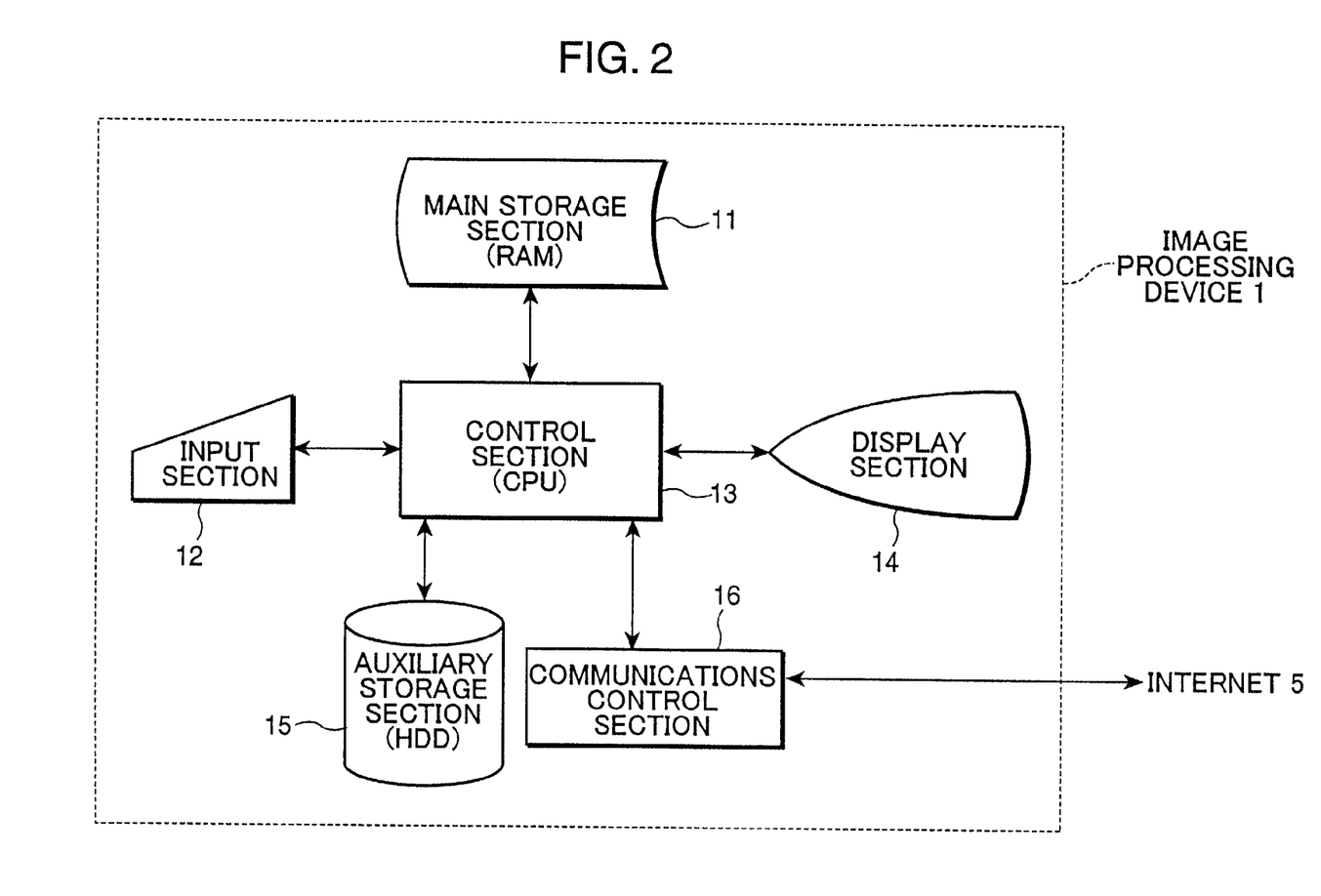
FIG. 2 is a block diagram showing a hardware construction of an image management device comprised in the present image processing system.
Figure 3:
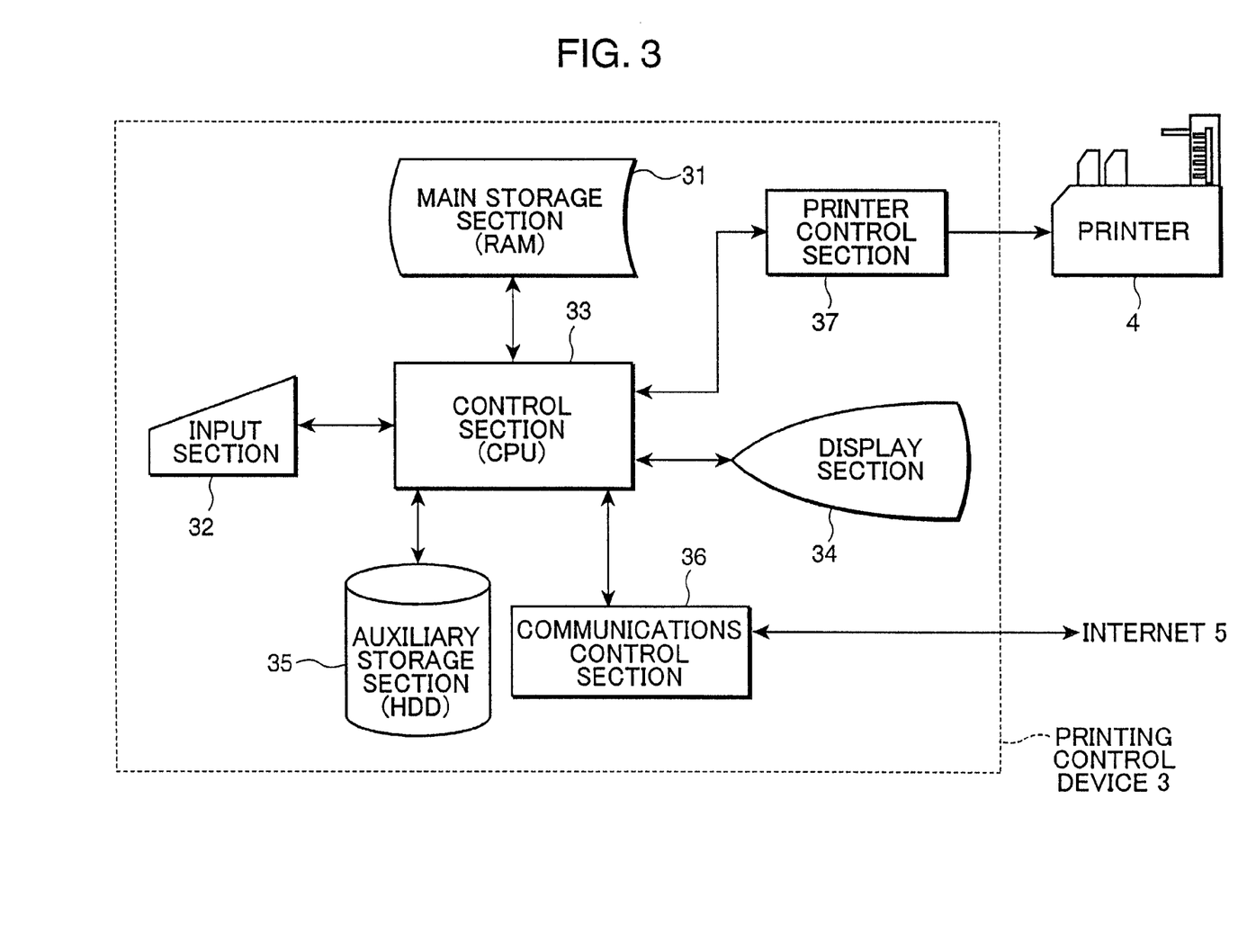
FIG. 3 is a block diagram showing a hardware construction of a printing control device.

FIG. 2 is a block diagram illustrating the hardware construction of an image management device 1 contained in the present image processing system (this applies similarly to PC 2); and FIG. 3 is a block diagram showing the hardware construction of a print control device 3.

As shown in FIG. 2, the image management device 1 (and PC 2) are standard programmable computers, provided with an input section 12 comprising a keyboard, mouse, or the like, for receiving inputs from the user, a display section 14 for providing a display to the user; a communication control section 16 for sending and receiving data via a network or the Internet 5, an auxiliary storage section (HDD) 15 for storing programs and data, a main storage section (PAM) 11 for temporarily storing programs and data, and a control section (CPU) 13 for executing programs in the main storage section 11, whilst controlling the input section 12, display section 14 auxiliary storage section 15 and communications control section 16.

Furthermore, as shown in FIG. 3, similarly to the image management device 1, the printing control device 3 comprises an input section 32, display section 34, communications control section 36, auxiliary storage section 35, main storage section 31, and control section 33, and it is also provided with a printer control section 37 forming an interface with the printer 4, for controlling the printer 4.

In practice, software for causing the hardware devices of the image management device 1 and the printing control device 3 to operate as a web server, database server, or the like, is installed on a prescribed OS in the image management device 1 and the printing control device 3. Moreover, a web browser and a program for generating an image file from a digital camera (using hardware providing a prescribed interface), or the like, is installed in the PC 2, and a special program for issuing develop and print instructions, and the like, to the printer 4 is installed in the printing control device 3. The data transmission processing performed by the image management device 1 and the data reception processing performed by the printing control device 3, the details of which are illustrated hereinafter in FIGS. 4 to 11, are executed in conjunction with the use of the aforementioned software.

Figure 4:
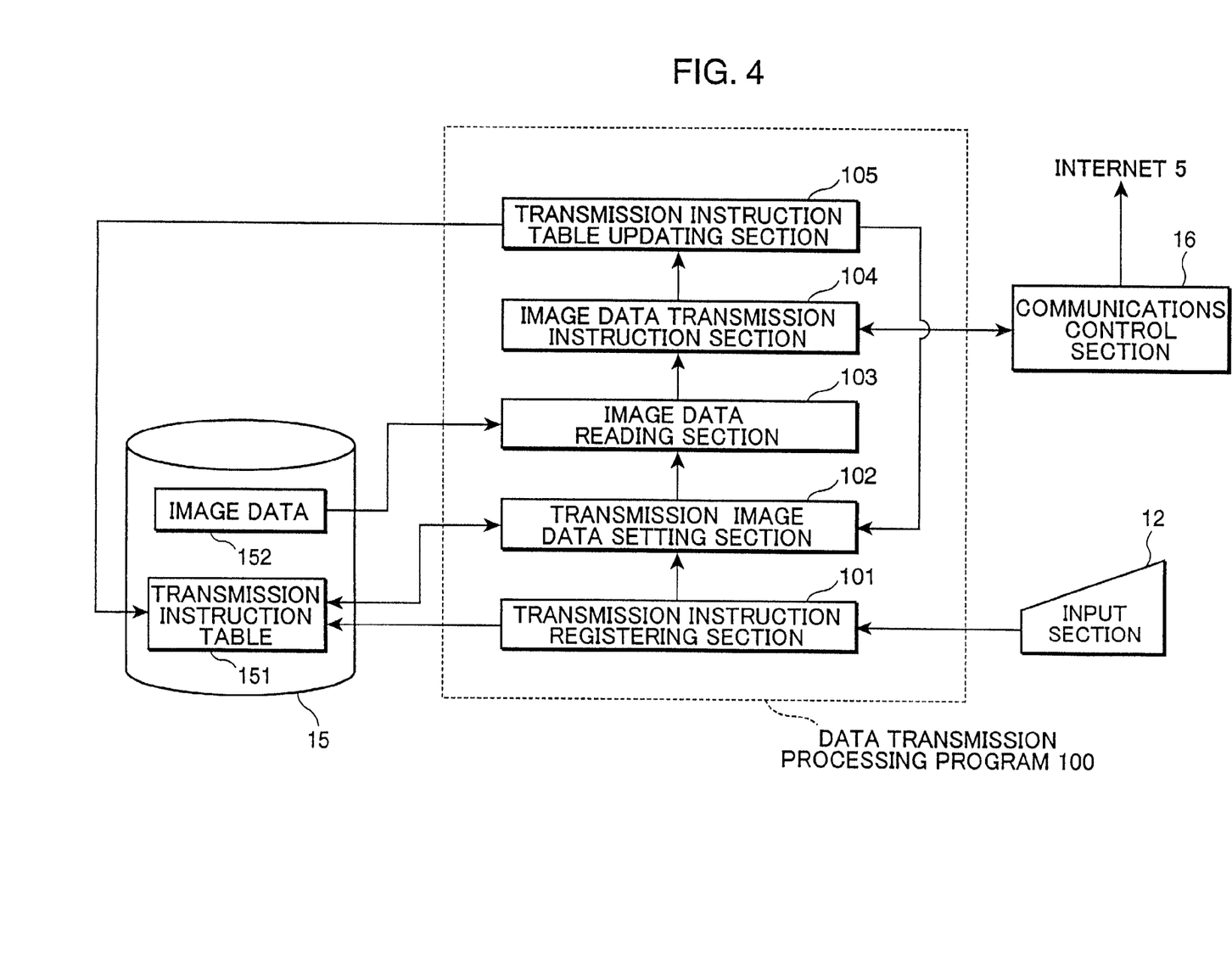
FIG. 4 is a block diagram showing a construction of a data transmission process program executed by the image management device.
Figure 5:
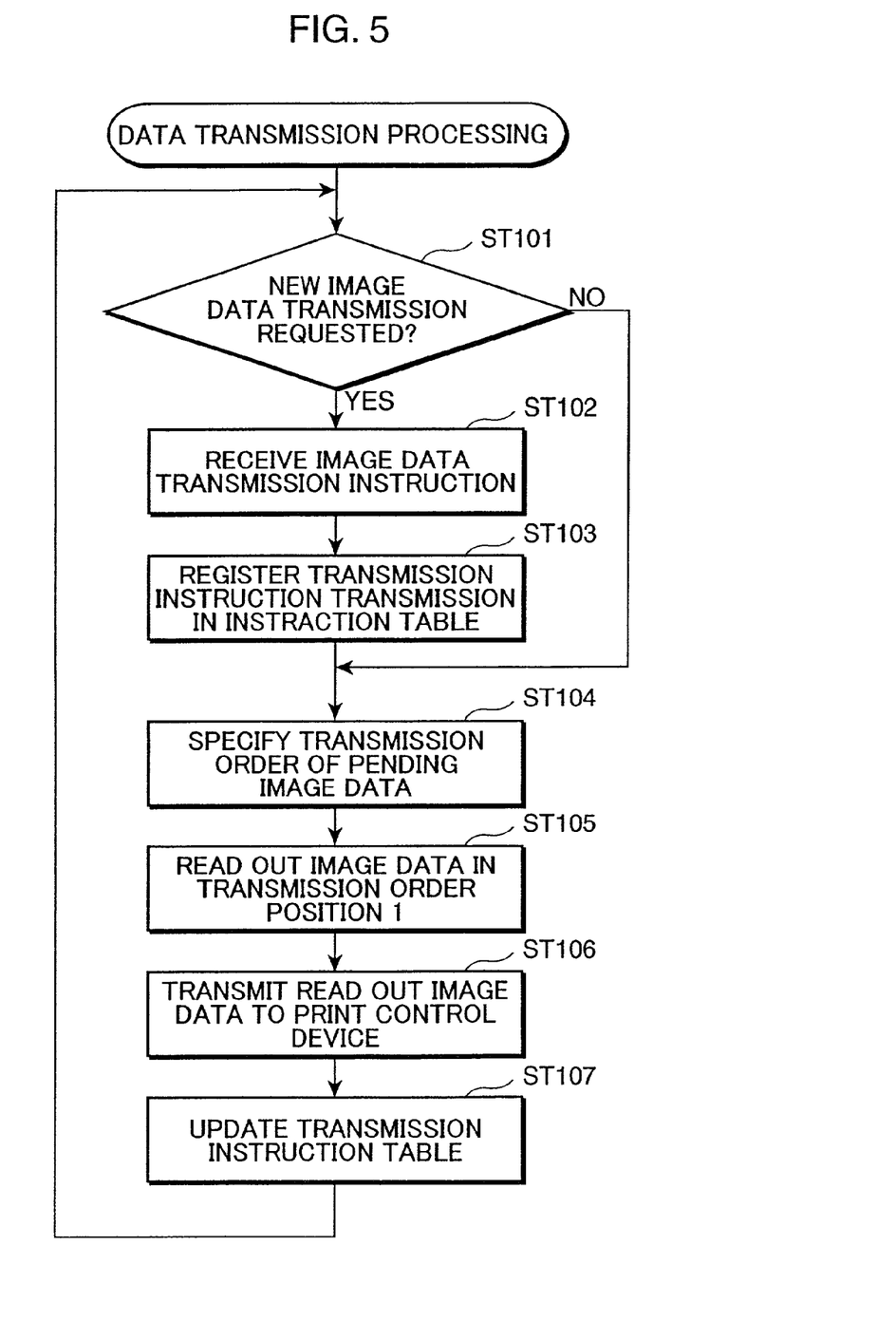
FIG. 5 is a flowchart illustrating a sequence of data transmission processing.
Figure 6:
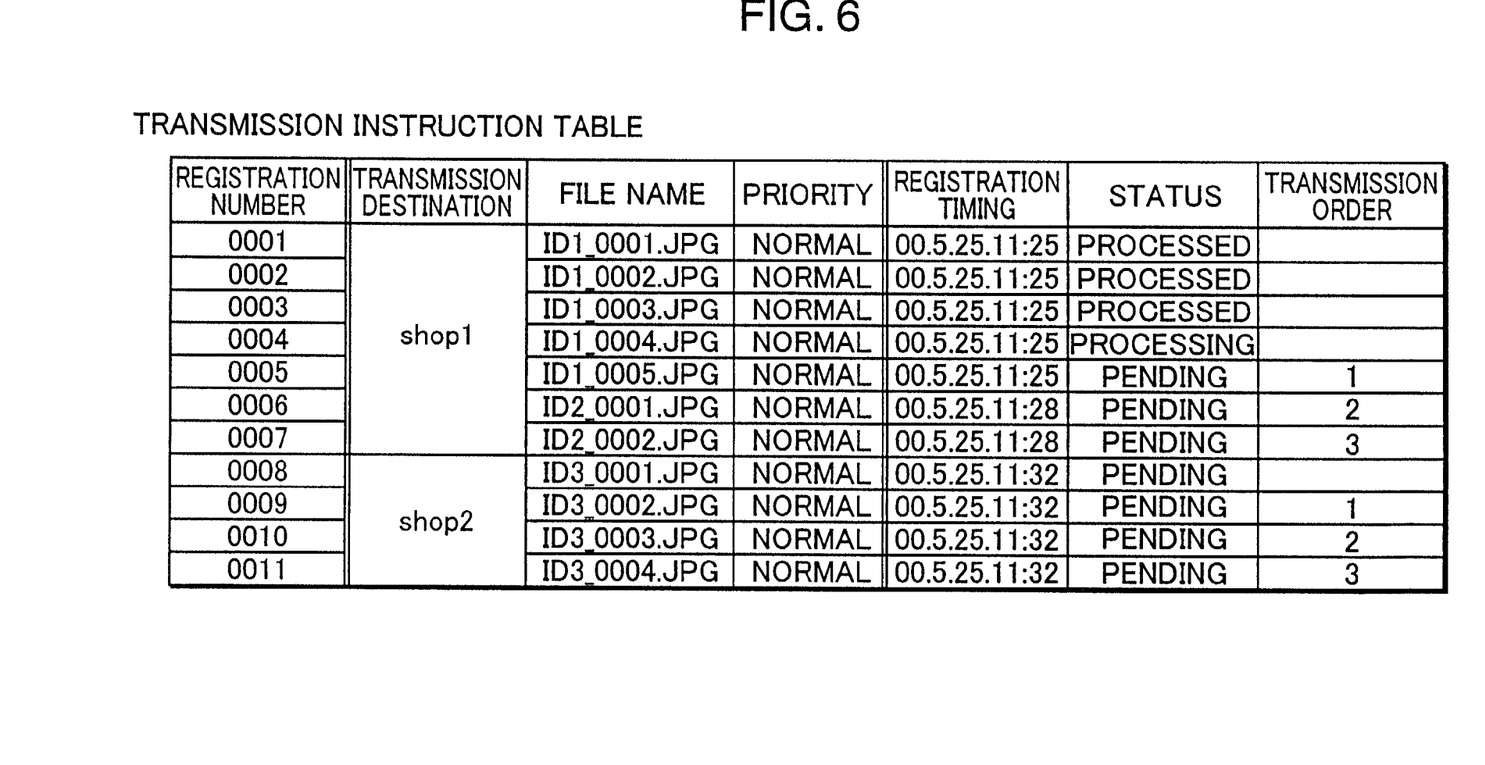
FIG. 6 is a first diagram showing a transmission instruction table updated and used by data transmission processing.
Figure 7:
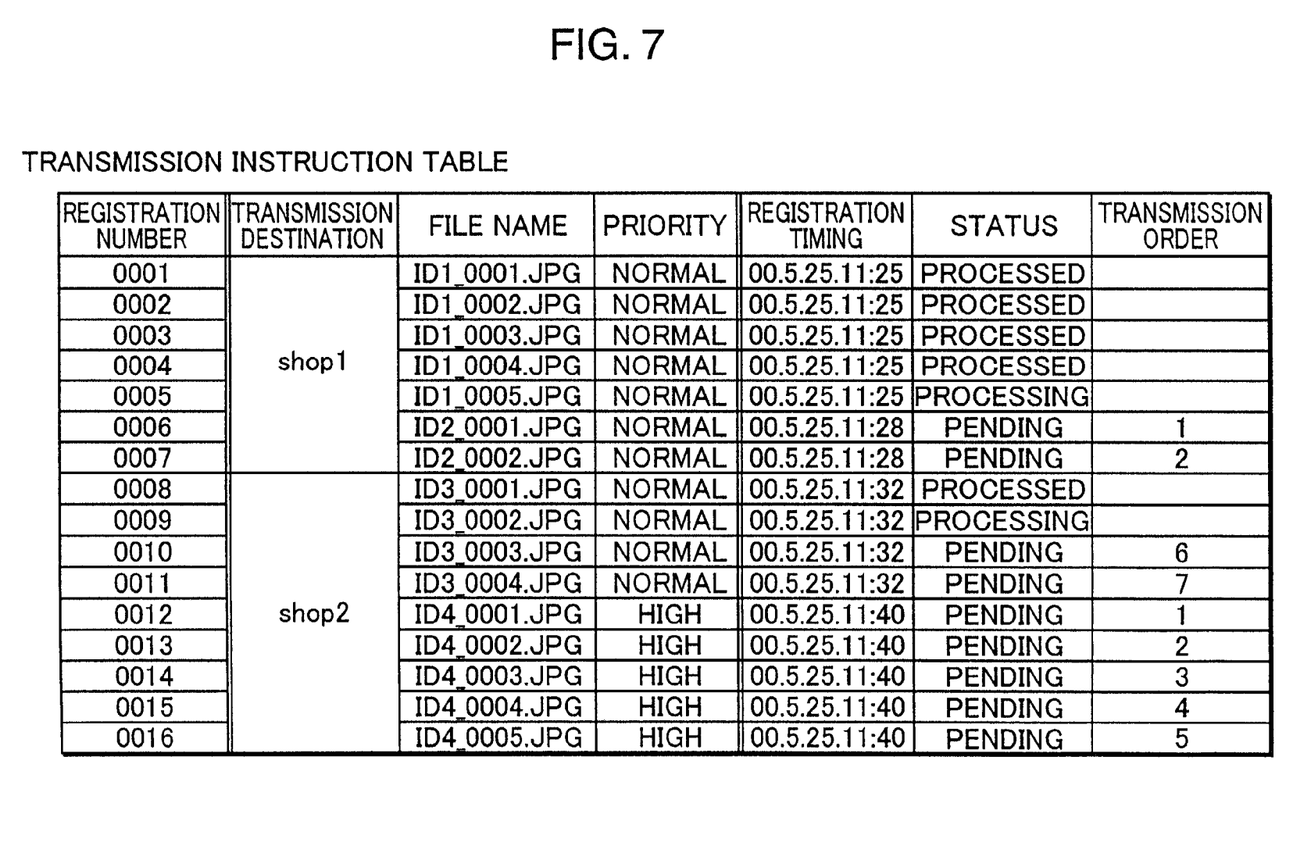
FIG. 7 is a second diagram showing a transmission instruction table updated and used by data transmission processing.
Figure 8:
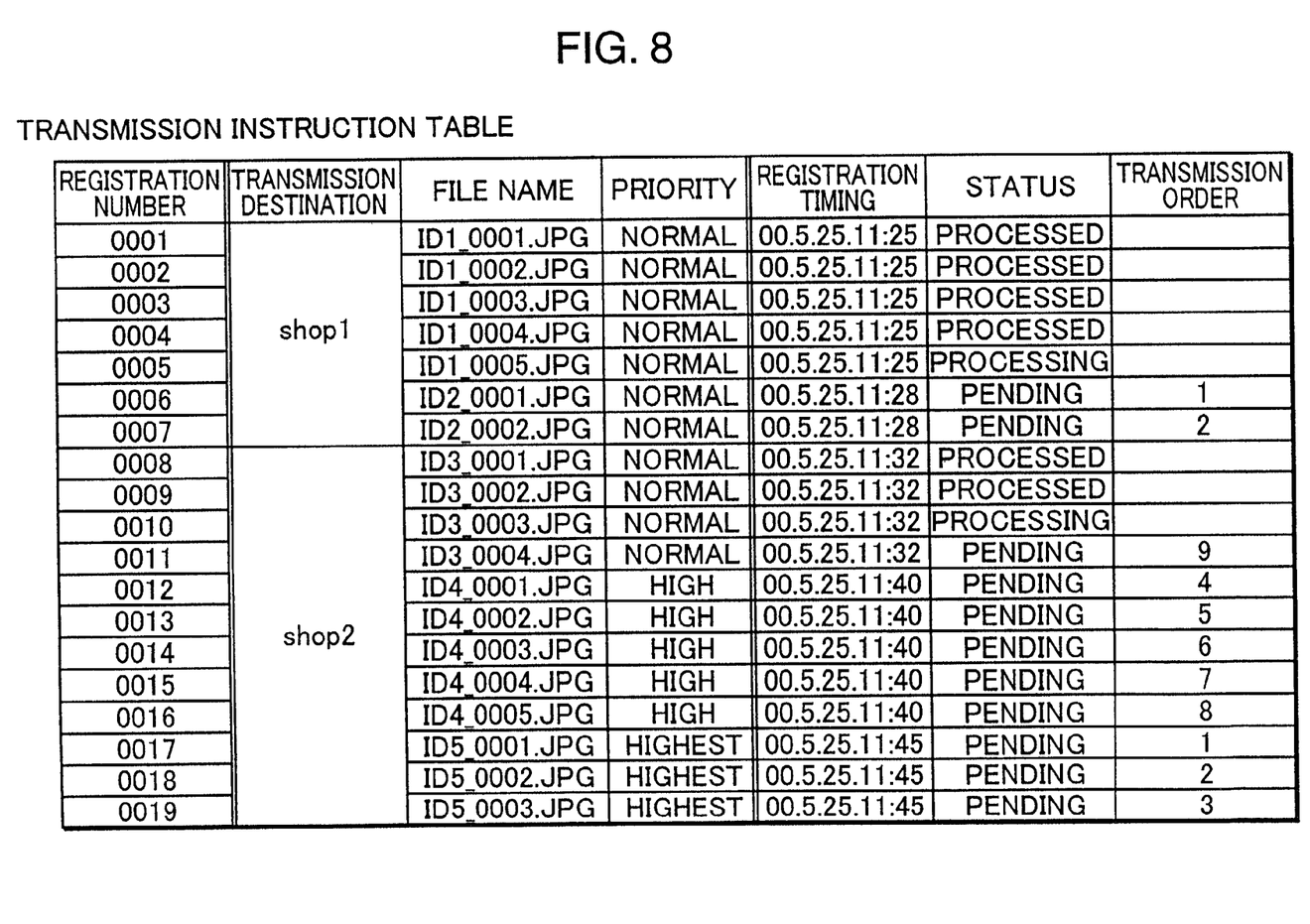
FIG. 8 is a third diagram showing a transmission instruction table update and used by data transmission processing.

FIG. 4 is a block diagram showing the construction of a data transmission process program 100 executed by the image management device 1. FIG. 5 is a flowchart showing the sequence of data transmission processing, and FIGS. 6 to 8 are diagrams showing a transmission instruction table which is updated by and used during data transmission processing. In particular, here, it is assumed that the data transmission processing illustrated in FIG. 5 is executed for a single transmission destination, but in practice, this data transmission processing is executed simultaneously in parallel for a plurality of transmission destinations.

In this image processing system, when, for example, image data is received simultaneously at respective transmission rates of 64 Kbps from five print control devices, then the five image data are transmitted simultaneously in parallel from the image management device, at a total communications rate of (64×5) Kbps, and if image data is received simultaneously at respective transmission rates of 64 Kbps from fifteen print control devices, then the fifteen image data are transmitted simultaneously in parallel from the image management device, at a total communications rate of (64×15) Kbps. If the communications rate in the case of a plurality of image data exceeds the capacity of the communications circuit from the image management device to the Internet, then it is possible for the destination printing control device to be changed every several seconds, or several minutes.

As shown in FIG. 4, when the data transmission process program 100 is executed by the image management device 1, the image data 152 transmitted by a PC 2 or a printing control device 3 is previously stored in the auxiliary storage section 15, and furthermore, the image data transmission instructions to each one of the plurality of printing control devices are stored in a transmission instruction table 151 (as shown by the examples in FIGS. 6 to 8 explained hereinafter).

The data transmission process program 100 comprises: a transmission instruction registering section 101 for registering transmission instructions input via the input section 12 and issued to the printing control devices 3, in the transmission instruction table 151 of the auxiliary storage section 15; a transmission image data setting section 102 for setting the transmission order for the image data corresponding to respective printing control devices 3; an image data reading section 103 for reading out the image data having the highest transmission order position, from the auxiliary storage section 15; a data transmission instruction section 104 for instructing transmission of the read out image data to the communication control section 16; and a transmission instruction table updating section 105 for updating the transmission instruction table 151.

As shown in FIG. 5, in the data transmission processing, firstly, in the transmission instruction registering section 101 (see FIG. 4), it is determined whether or not a new image data transmission request has been made by the operator of the image management device 1 (ST101).

If a new image data transmission request has been made (Yes at ST101), then input of an image data transmission instruction by the operator is accepted in the transmission instruction registering section 101 (ST102), the input transmission instruction and the timing at which the transmission instruction was input are registered in the transmission instruction table 151 (ST103), and in the transmission image data setting section 102, a transmission order for each transmission destination is set for the image data awaiting transmission (for which transmission has been instructed but not yet executed) (ST104). Here, it is supposed that transmission instructions are input via the input section 12 at ST102, but it is also possible for a transmission instruction file containing these transmission instructions to be received from the PC 2, for example, and for transmission instructions to be input according to the received transmission instruction file.

Thereupon, in the image data reading section 103, the image data having transmission order position 1 is read out (ST105), in the image data transmission instruction section 104, the image data thus read out is transmitted to printing control device (ST106), and in the transmission instruction table updating section 105, the processing status in the transmission instruction table 151 is updated (ST107), whereupon the sequence returns to step of ST101.

In practice, in the transmission and reception table shown in FIG. 6, the registered transmission instructions are managed by means of registration numbers in registration order, and the table includes the transmission destination, the filename of the image data to be transmitted, and the processing priority, and also records the timing at which each transmission instruction was issued. Moreover, the table also indicates statuses, namely, "Processed", "Processing", "Pending", depending on whether the respective image data has been transmitted, is currently being transmitted, or has not yet been transmitted.

In this transmission instruction table, with regard to the transmission instructions with registration number "0001" to registration number "0003", the corresponding image data has already been sent to destination "shop 1", the image data corresponding to the transmission instruction with registration number "0004" and the image corresponding to the transmission instruction with registration number "0008" are being transmitted respectively to destinations "shop1" and "shop2", the image data corresponding to the transmission instructions with registration number "0005" to registration number "0007" and the image data corresponding to the transmission instructions with registration number "0009" to registration number "0011" are shown as pending transmission, and the transmission orders for destination "shop1" and destination "shop2" have been set for the image data awaiting transmission.

It is assumed that the transmission indicators for these image data are all registered at "normal" priority, but as shown in FIG. 7 and FIG. 8, it is also possible to set a "high" or "highest" priority.

For example, the transmission of image data having a "high" priority, as described hereinafter, is implemented in advance of the image data having "normal" priority of the image data having "pending" status, which was accepted for image data up to 30 minutes previously, and the transmission of image data having "highest" priority is implemented in advance of all image data having "pending" status.

Figure 9:
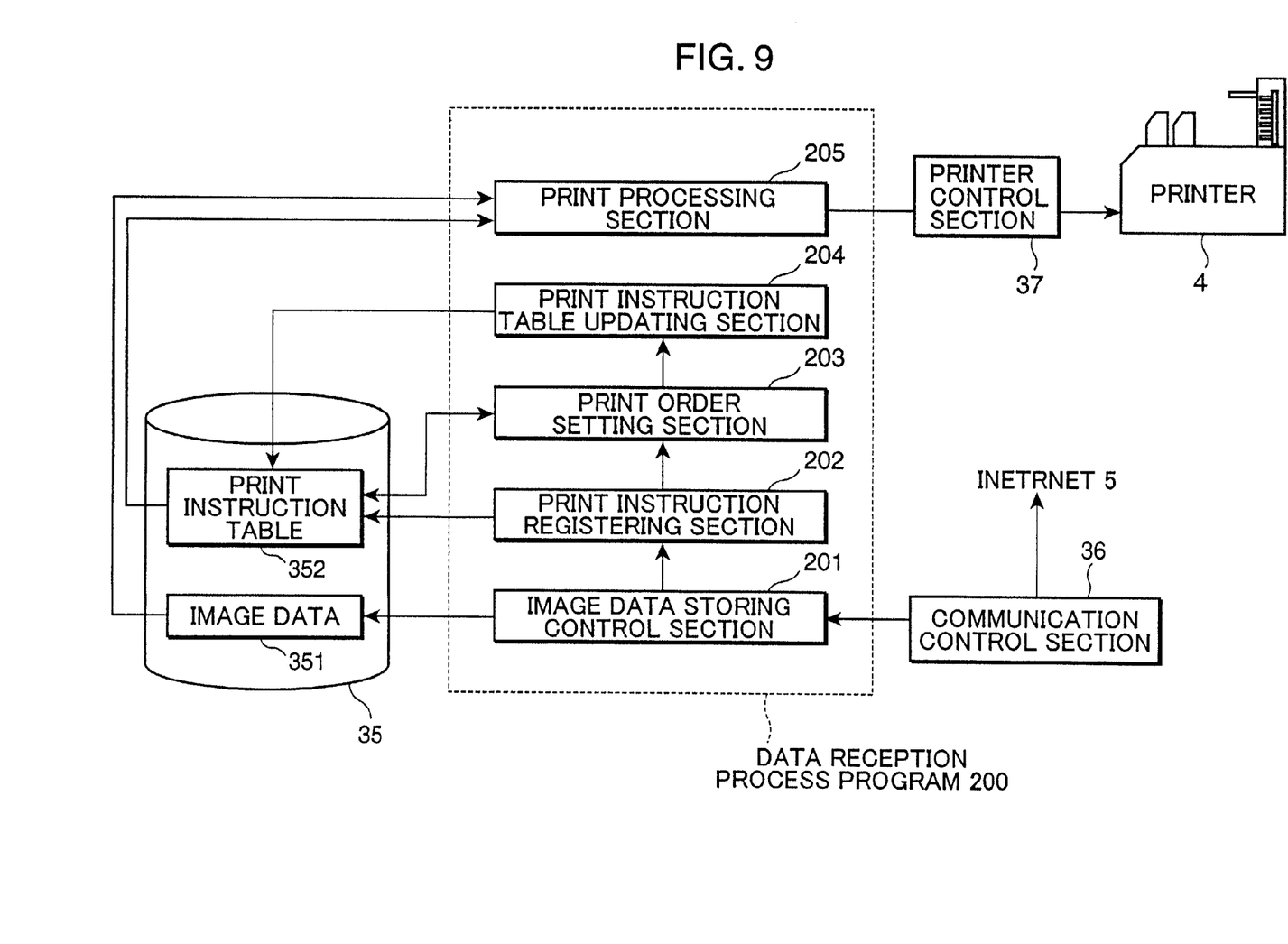
FIG. 9 is a block diagram showing a construction of a data reception processing program executed by a printing control device.
Figure 10:
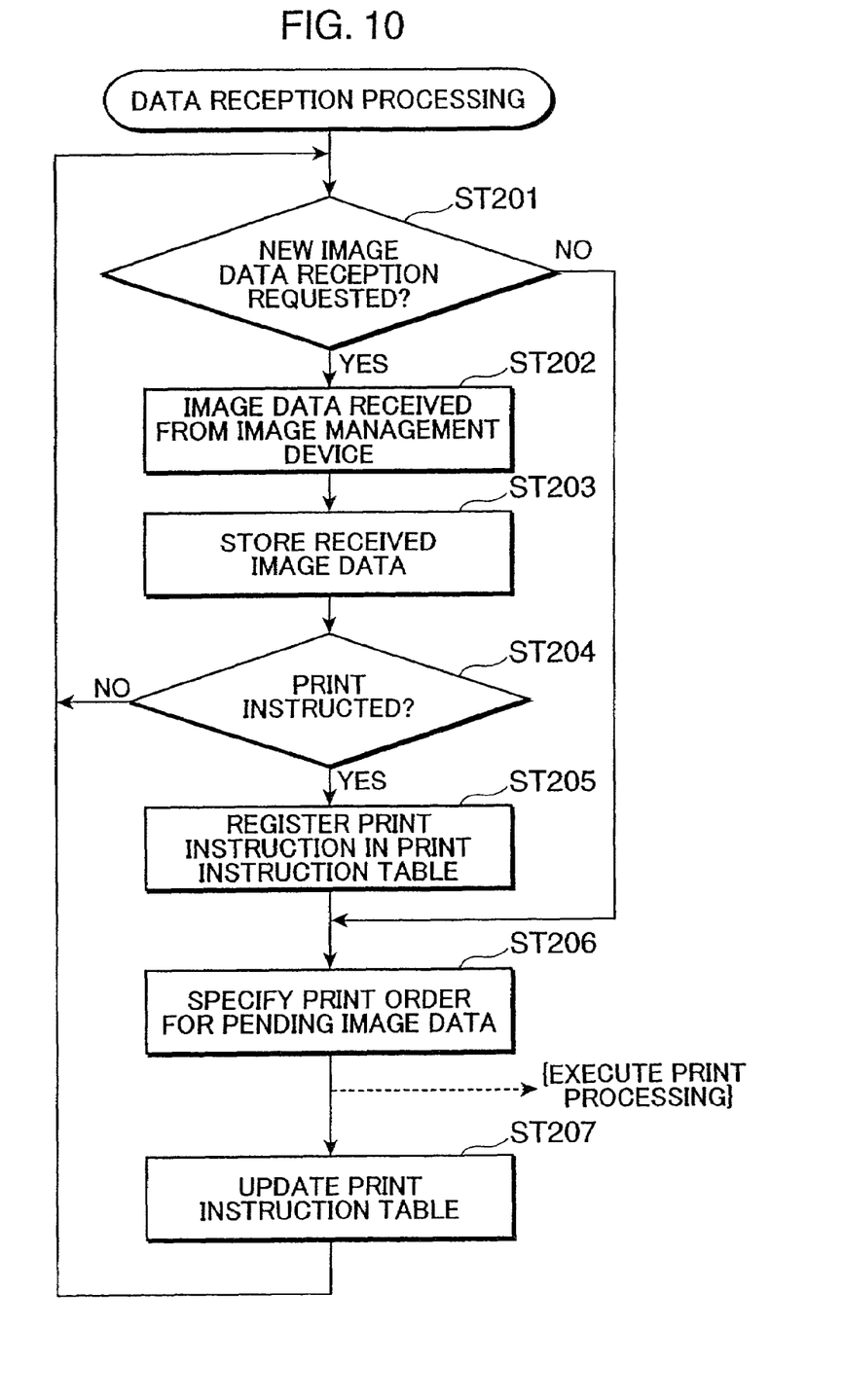
FIG. 10 is a flowchart showing a sequence of data reception processing.
Figure 11:
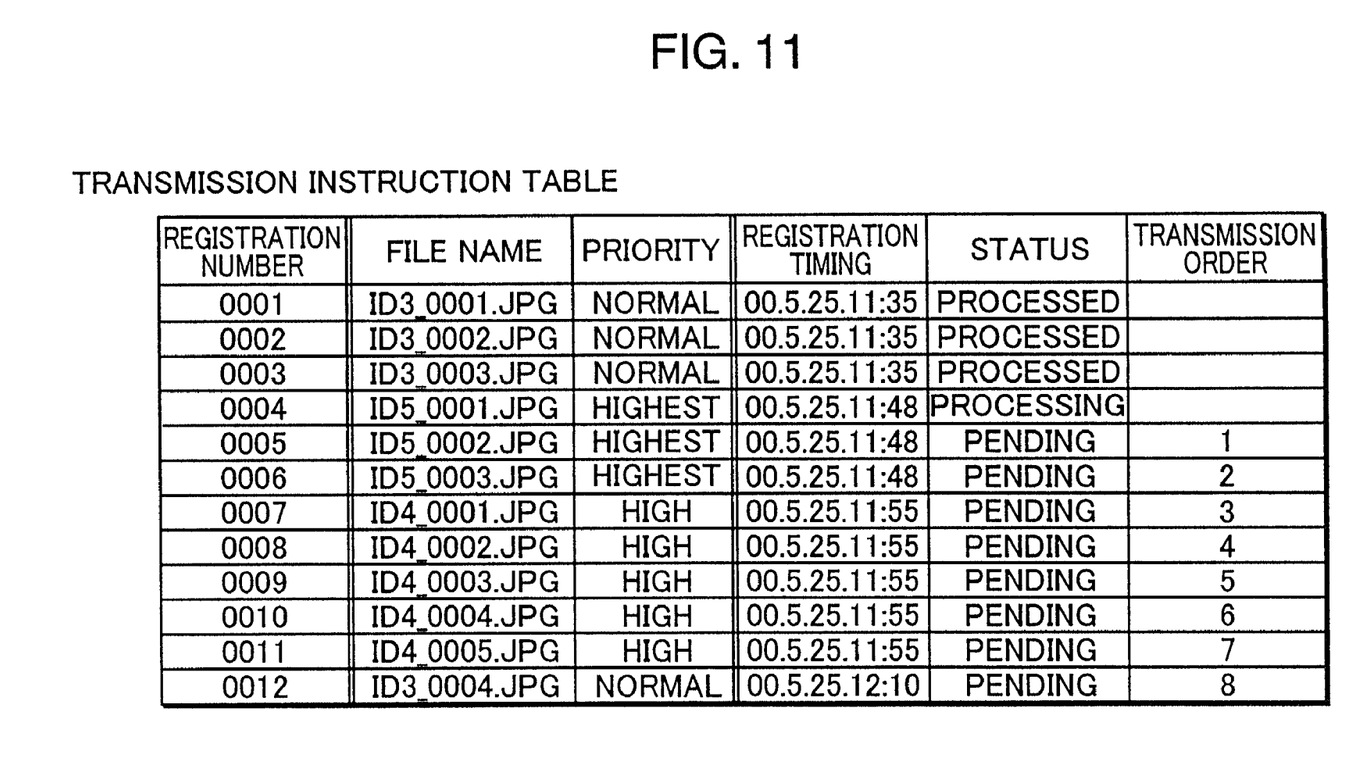
FIG. 11 is a diagram showing a print instruction table updated and used by data reception processing.

FIG. 9 is a block diagram showing the construction of the data reception process program 200 executed by the printing control device 3. FIG. 10 is a flowchart showing the sequence of the data reception processing, and FIG. 11 is a diagram showing a print instruction table used in and updated by data reception processing. As shown in FIG. 9, it is supposed that data reception and printing are implemented separately, in parallel fashion.

As shown in FIG. 9, when the data reception program 200 is executed by the print control device 3, the auxiliary storage section 35 stores the image data 351 for printing, and a print instruction to the printer 4 is stored in the print instruction table 352 as illustrated by the example in FIG. 11 explained hereinafter.

The data reception process program 200 comprises: an image data storage control section 201 for storing image data received from the communication control section 36 in the auxiliary storage section 35; a print instruction registration section 202 for registering print instruction based on reception of image data, in the print instruction table 352 of the auxiliary storage section 35; a print order setting section 203 for setting a print order for received image data; and a print instruction table updating section 204 for updating the print instruction table 352.

As shown in FIG. 10, in data reception processing, firstly, in the image data storage control section 201 (see FIG. 9), it is determined whether or not reception of new image data has been requested by the image management device 1 (ST201).

If reception of new image data has been requested by the image management device 1 (Yes at ST201), then the image data is received (ST202), the received image data is stored in the auxiliary storage section 35 (ST203), and it is determined whether or not a print instruction has been issued, according to previous settings made to the printing control device 3, or the like (ST204).

If printing has not been instructed (No at ST204), then the sequence returns to step of ST201, and if printing has been instructed (Yes at ST204), then in the print instruction registration section 202, a print instruction is registered in the print instruction table 352 (ST205), and the process then moves to ST206.

Furthermore, if no new image data transmission request has been made by the image management device 1 (No at ST201), then the sequence moves directly to ST206, without implementing the processing in steps of ST202 to ST205.

At ST206, in the print order setting section 203, the print order is established for the pending image data, and in the print processing section 205, print processing based on the established print order is executed in parallel with data reception, and the processing statuses in the print instruction table 352 are then updated according to whether or not the printing based on the image data has been completed (ST207), whereupon the sequence returns to step of ST201.

In practice, in the print instruction table shown in FIG. 11, the registered print instructions are managed by registration numbers in registration order, and the table also includes the filename of the image data to be printed, and the processing priority thereof, as well as the timing at which the print instruction was issued. Furthermore, the table also indicates a status of "Processed", "Processing" or "Pending", depending on whether the image data has been printed, is currently being printed, or has not yet been printed.

In this print instruction table, printing of the images (photographs) corresponding to the print instructions having registration number "0001" to registration number "0003" have already been completed, printing of the image corresponding to the image data having registration number "0004" is currently in progress, and printing of the images corresponding to print instructions having registration number "0005" to registration number "0012" are queued.

Here, it is supposed that the printing control device 3 corresponds to the transmission destination "shop2" in the transmission instruction table shown in FIG. 8, and image data is received according to the transmission order for destination "shop2", a print order being established according to the received image data, and printing being carried out according to this order, but at the printing control device 3, it is also possible for modifications to the print order to be accepted, in such a manner that the images are printed in the desired order of the operator of the printing control device 3.

As described above, in the present image processing system, transmission of image data from an image management device to a plurality of print control device is carried out in parallel on the basis of an established order for each transmission destination set in accordance with the timing at which transmission was instructed and the priority set by the operator, and hence a communications circuit of approximately several 10–100 Kbps can be used efficiently at all times at the printing control devices for receiving image data, thereby making it possible to transmit and receive image data in an efficient manner whilst using communications circuits of relatively narrow bandwidth in the printing control devices.

Furthermore, by, for example, setting the printing control devices so that they only receive image data during the night, whilst during the day, they both receive image data and perform printing, it is possible to make printing operations by the printing control devices coincide with the presence of operators supervising such operations, and hence image data reception and transmission, and printing, can be carried out in a more advantageous manner.

As described above, an inventive image data transmission device is adapted for transmitting a plurality of groups of image data stored in a storage section to a prescribed plurality of image data reception devices connected thereto via a network. The image data transmission device comprises: a memory which stores transmission destination data identifying an image data reception device forming a transmission destination, and timing data indicating the timing at which transmission was instructed, in a corresponding fashion with each group of image data to be transmitted; a setter which sets a transmission order for image data for each transmission destination, on the basis of the timing data; and a transmission controller which controls a plurality of image data corresponding to a plurality of transmission destinations, in such a manner that the image data is transmitted in parallel according to the set transmission order for each transmission destination.

The memory may store priority data indicating a transmission priority in addition to transmission destination data identifying an image data reception device forming a transmission destination and timing data indicating the timing at which transmission was instructed, in a corresponding fashion with each group of image data to be transmitted, inside the storage section. The setter may set a transmission order for the image data for each transmission destination on the basis of the timing data and the priority data.

It may be preferable to set at least two levels of priority in the priority data, and set a transmission order for the image data for each transmission destination in such a manner that the transmission of image data having a high priority is performed prior to the transmission of image data having normal priority which was instructed for transmission within a prescribed period of time before the timing of the new instruction.

Alternatively, it may be preferable to set at least two levels of priority in the priority data; and set a transmission order for the image data for each transmission destination in such a manner that the transmission of newly instructed image data having a high priority is performed prior to the transmission of all image data having normal priority which has been instructed for transmission and is awaiting transmission.

It may be preferable to use the Internet as the network.

An inventive image data transmission method is adapted for transmitting a plurality of groups of image data stored in a storage section to a prescribed plurality of image data reception devices connected thereto via a network. The method comprises the steps of: storing transmission destination data identifying an image data reception device forming a transmission destination, and timing data indicating the timing at which transmission was instructed, in a corresponding fashion with each group of image data to be transmitted, inside the storage section; setting a transmission order for image data for each transmission destination, on the basis of the timing data; and controlling a plurality of image data corresponding to a plurality of transmission destinations, in such a manner that the image data is transmitted in parallel according to the set transmission order for each transmission destination.

Further, it may be appreciated to realize the inventive method by a computer program. Also, it may be appreciated to provide a computer-readable storage medium storing this program.

An inventive image data transmission and reception system comprises an image data transmission device for transmitting a plurality of groups of image data stored in a storage section, on the basis of transmission instructions, and a plurality of image data reception devices connected to the image data transmission device via a network. The image data transmission device comprises: a memory which stores transmission destination data identifying an image data reception device forming a transmission destination, and timing data indicating the timing at which transmission was instructed, in a corresponding fashion with each group of image data to be transmitted, inside the storage section; a setter which sets a transmission order for image data for each transmission destination, on the basis of the timing data; and a transmission controller which controls a plurality of image data corresponding to a plurality of transmission destinations, in such a manner that the image data is transmitted in parallel according to the set transmission order for each transmission destination. The image data reception devices comprise: a memory which stores transmitted image data; a judger which judges whether or not printing has been instructed; and a printer which performs printing on the basis of the stored image data, if it is judged that printing has been instructed.

An inventive image data transmission and reception method is adapted for a system including an image data transmission device for transmitting a plurality of groups of image data stored in a storage section, on the basis of transmission instructions, and a plurality of image data reception devices connected to the image data transmission device via a network. This method comprises the steps of: in the image data transmission device, storing transmission destination data identifying an image data reception device forming a transmission destination, and timing data indicating the timing at which transmission was instructed, in a corresponding fashion with each group of image data to be transmitted, inside the storage section; setting a transmission order for image data for each transmission destination, on the basis of the timing data; and controlling a plurality of image data corresponding to a plurality of transmission destinations, in such a manner that the image data is transmitted in parallel according to the set transmission order for each transmission destination; and, in the image data reception devices, storing transmitted image data; judging whether or not printing has been instructed; and performing printing on the basis of the stored image data, if it is judged that printing has been instructed.

Accordingly, a plurality of image data corresponding to a plurality of destinations are transmitted in parallel according to a transmission order for each destination based on the timing at which transmission was instructed, and hence image data can be transmitted and received in an efficient manner, whilst using communications circuits having a relatively narrow bandwidth at the image data reception devices.

Also, a plurality of image data corresponding to a plurality of destinations are transmitted in parallel according to a transmission order for each destination based on the timing at which transmission was instructed, and an established priority, and hence image data can be transmitted and received in an efficient manner.

Further, image data can be transmitted and received by using suitably established priorities, and hence image data can be transmitted and received in an efficient manner whilst using communications circuits having a relatively narrow bandwidth at the image data reception devices.

This application is based on patent application No. 2000-168577 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image data transmission device for transmitting a plurality of groups of image data to a prescribed plurality of image data reception devices connected thereto via a network, comprising:
    a memory which stores the plurality of groups of image data, transmission destination data which identify, for each group of image data, an image data reception device that receives the image data of the group, timing data indicating the time at which transmission of the image data was instructed, and a priority data that indicates whether the group of image data should be transmitted with priority to other image data;
    a setter which sets, for each transmission destination, the order in which the plurality of groups of image data are transmitted, the order being set on the basis of the timing data and the priority data; and
    a transmission controller which controls transmission of the image data stored in the memory, in accordance with the order set by the setter.

2. The image data transmission device according to claim 1, wherein the network is the Internet.

3. An image data transmission device for transmitting a plurality of groups of image data stored in a storage section to a prescribed plurality of image data reception devices connected thereto via a network, comprising:
    a memory which stores transmission destination data identifying an image data reception device forming a transmission destination, and timing data indicating the timing at which transmission was instructed, in a corresponding fashion with each group of image data to be transmitted;
    a setter which sets a transmission order for image data for each transmission destination, on the basis of the timing data; and
    a transmission controller which controls a plurality of image data corresponding to a plurality of transmission destinations, in such a manner that the image data is transmitted in parallel according to the set transmission order for each transmission destination,
    wherein the memory further stores priority data indicating a transmission priority, in a corresponding fashion with each group of image data to be transmitted, inside the storage section; and
    the setter sets a transmission order for the image data for each transmission destination on the basis of the timing data and the priority data,
    wherein at least two levels of priority are set in the priority data; and
    the setter sets a transmission order for the image data for each transmission destination in such a manner that the transmission of image data having a high priority is performed prior to the transmission of image data having normal priority which was instructed for transmission within a prescribed period of time before the timing of the new instruction.

4. The image data transmission device according to claim 3, wherein the setter sets a transmission order for the image data for each transmission destination in such a manner that the transmission of newly instructed image data having a high priority is performed prior to the transmission of all image data having normal priority which has been instructed for transmission and is awaiting transmission.

5. An image data transmission method for transmitting a plurality of groups of image data to a prescribed plurality of image data reception devices connected thereto via a network, comprising:
    storing the plurality of groups of image data, transmission destination data which identify for each group of image data, an image data reception device that receives the image data of the group timing data indicating the time at which transmission was instructed a priority data that indicates whether the group of image data should be transmitted with priority to other image data;
    setting for each transmission destination, the order in which the plurality of groups of image data are transmitted, the order being set on the basis of the timing data and the priority data; and
    controlling transmission of the image data in accordance with the set order.

6. The image data transmission method according to claim 5, wherein the network is the Internet.

7. An image data transmission method for transmitting a plurality of groups of image data stored in a storage section to a prescribed plurality of image data reception devices connected thereto via a network, comprising the steps of:
    storing transmission destination data identifying an image data reception device forming a transmission destination, and timing data indicating the timing at which transmission was instructed, in a corresponding fashion with each group of image data to be transmitted, inside the storage section;
    setting a transmission order for image data for each transmission destination, on the basis of the timing data; and
    controlling a plurality of image data corresponding to a plurality of transmission destinations, in such a manner that the image data is transmitted in parallel according to the set transmission order for each transmission destination,
    wherein in the storing step, priority data indicating a transmission priority is further stored, and in the setting step, the transmission order is set on the basis of the timing data and the priority data,
    wherein at least two levels of priority are set in the priority data; and in the setting step, the transmission order is set in such a manner that the transmission of image data having a high priority is performed prior to the transmission of image data having normal priority which was instructed for transmission within a prescribed period of time before the timing of the new instruction.

8. The image data transmission method according to claim 7, wherein in the setting step, the transmission order is set in such a manner that the transmission of newly instructed image data having a high priority is performed prior to the transmission of all image data having normal priority which has been instructed for transmission and is awaiting transmission.

9. A computer-readable storage medium storing a program for transmitting a plurality of groups of image data to a prescribed plurality of image data reception devices connected thereto via a network, wherein the program is designed such that:

the plurality of groups of image data, transmission destination data which identify for each group of image data, an image data reception device that receives the image data of the group timing data indicating the time at which transmission was instructed, and a priority data that indicate whether the group of image data should be transmitted with priority to other image data, are stored in a storage section in a corresponding fashion with each group of image data to be transmitted;

a transmission order for image data for each transmission destination is set on the basis of the timing data and the priority data; and transmission of a plurality of image data to a plurality of transmission destinations is controlled in accordance with the set transmission order for each transmission destination.

10. The computer-readable storage medium according to claim 9, wherein the network is the Internet.

11. An image data transmission and reception system comprising an image data transmission device for transmitting a plurality of groups of image data in accordance with transmission instructions, and a plurality of image data reception devices connected to the image data transmission device via a network to receive the image data from the image data transmission device, wherein the image data transmission device comprises:

a memory which stores the plurality of groups of image data, transmission destination data that identify for each group of image data, an image data reception device timing data indicating the time at which transmission was instructed, and a priority data that indicates whether the group of image data should be transmitted with priority to other image data;

a setter which sets, for each transmission destination, the order in which the plurality of groups of image data are transmitted, the order being set on the basis of the timing data and the priority data; and a transmission controller which controls transmission of the image data in accordance with the set order; and the image data reception devices comprise:

a memory which stores transmitted image data;

a judger which judges whether or not printing has been instructed; and a printer which performs printing on the basis of the stored image data, if it is judged that printing has been instructed.

12. The image data transmission and reception system according to claim 11, wherein the network is the Internet.

13. An image data transmission and reception method for use with an image data transmission device for transmitting a plurality of groups of image data in accordance with transmission instructions, and a plurality of image data reception devices connected to the image data transmission device via a network to receive the image data from the image data transmission device, comprising the steps of:

in the image data transmission device, storing the plurality of groups of image data, transmission destination data that identify for each group of image data, an image data reception device, timing data indicating the time at which transmission was instructed, and a priority data that indicates whether the group of image data should be transmitted with priority to other image data;

setting for each transmission destination, the order in which the plurality of groups of image data are transmitted, the order being set on the basis of the timing data and the priority data; and controlling transmission of the image data in accordance with the set order; and in the image data reception devices, storing transmitted image data;

judging whether or not printing has been instructed; and performing printing on the basis of the stored image data, if it is judged that printing has been instructed.

14. An image data transmission and reception method according to claim 13, wherein the network is the Internet.

* * * * *